June 15, 1926.　　　　　　　　　　　　　　　　1,588,685
H. M. ORRISS
ATTACHMENT FOR EYEGLASSES
Filed August 24, 1923
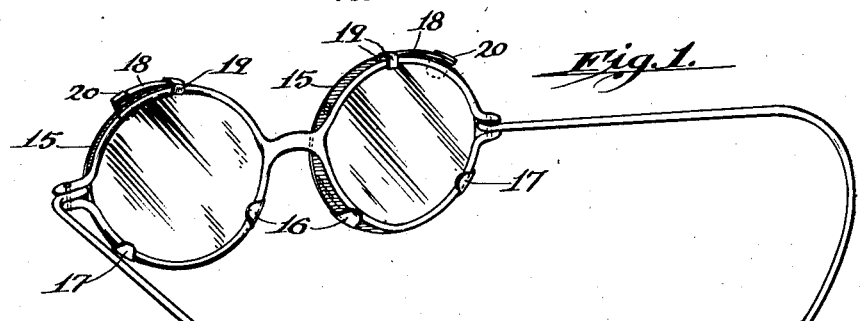
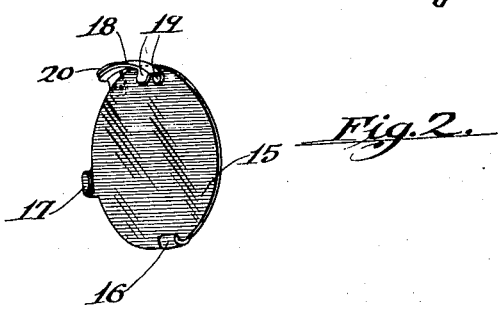
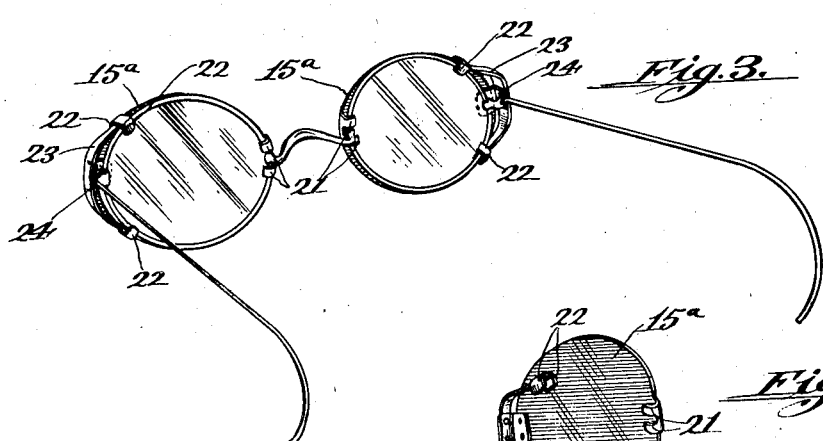
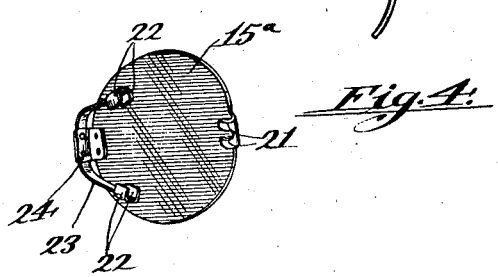
Inventor:
HERBERT M. ORRISS.
BY Hazard and Miller
Attorneys.
Witness:

Patented June 15, 1926.

1,588,685

UNITED STATES PATENT OFFICE.

HERBERT M. ORRISS, OF MONTECITO, CALIFORNIA.

ATTACHMENT FOR EYEGLASSES.

Application filed August 24, 1923. Serial No. 659,161.

My invention relates to eyeglasses and spectacles and a purpose of my invention is the provision of an attachment therefor by which they can be quickly and effectively converted into dark or sun glasses as commonly termed.

It is also a purpose of my invention to provide an attachment of the above described character of extremely inexpensive, durable and efficient construction, and which includes attaching means that may be varied in construction to a wide degree to permit of the attachment being applied to eyeglasses and spectacles of different size and construction.

Although I have herein shown and will describe only two forms of attachments embodying my invention, it is to be understood that various changes and modifications may be made herein without departing from the spirit of the invention and the spirit and scope of the appended claims.

In the accompanying drawings,

Fig. 1 is a view showing in perspective a pair of spectacles of the shell type having applied thereto one form of attachment embodying my invention.

Fig. 2 is a detailed perspective view of one of the attachments shown in Fig. 1.

Fig. 3 is a view similar to Fig. 1 showing a pair of spectacles of the metal type having applied thereto another form of attachment embodying my invention.

Fig. 4 is a detailed perspective view showing one of the attachments shown in Fig. 3.

Referring specifically to the drawings in which similar reference characters refer to similar parts, my invention in the embodiment shown in Figs. 1 and 2, comprises a lens 15 formed of any suitable transparent material such as celluloid or the like, and which is colored with any desired pigment. The lens 15 is provided at its periphery with attaching lips 16 and 17 preferably formed of the same material as the lens, but which may be formed of different material and attached thereto, as will be understood. These lips 16 and 17 are arranged at suitable points upon the periphery of the lens and at the inner side thereof so as to co-operate with a resilient member 18 carrying companion lips 19 at one end and an attaching plate 20 at the other, the latter in turn being suitably secured to the lens 15. This member 18 is, in the present instance, a curved leaf spring arranged to normally urge the lips 19 inwardly toward the center of the lens so that they normally occupy a position disaligned circumferentially with respect to the lips 16 and 17.

The attachment just described is particularly designed for use in conjunction with a pair of spectacles having shell frames and in which the mounting for each lens is of substantially circular formation. In the applied position of the attachment shown in Fig. 2, the lips 16, 17 and 19 engage the periphery of one of the lens mounts of the spectacles, the lips thus serving to hold the lens 15 in superposed relation with respect to the lens of the spectacles. It will be understood that in applying the attachment it is necessary to flex the spring 18 outwardly in order to permit of the insertion of the lens mount beneath the lips 16 and 17 when the member 18 is released, thereby causing the lips 19 to engage the lens mount and thus securely retain the dark lens upon the spectacles.

Referring now to Figs. 3 and 4, I have here shown a form of attachment which is particularly designed for use in connection with spectacles having metallic frames and in which the lens mounts are substantially of ovate formation. In this form of attachment, a lens 15ª is provided and such lens is formed of suitable transparent material, such as celluloid, glass or the like, which is suitably colored. The lens 15ª is of ovate form to correspond with the formation of the spectacle lens. Formed integrally with the lens 15ª are spaced lips 21 which co-operate with lips 22 for detachably securing the lens to the lens mount of the spectacles shown in Fig. 3. The lips 22 are arranged in pairs and at opposite ends of a resilient member 23 secured to the lens 15ª by a plate 24. The plate 24 is associated with the medial portion of the member 23 so as to provide spaced resilient arms for the two pairs of lips 22. The member 23 is preferably formed of celluloid, steel or the like and is so curved as to normally urge the two pairs of lips inwardly and beyond the periphery of the lens 15ª.

In the applied position of the attachment shown in Fig. 4, the spaced lips 21 engage the lens mount of the spectacles shown in Fig. 3 at opposite sides of the bridge of the spectacles, while the resilient member 23 is arranged to dispose its arms at opposite sides of the temple connection so that the two pairs of lips 22 engage the lens mount at opposite sides of the connection. In this manner the arms of the member 23 are held under tension so as to cause the several pairs of lips to securely embrace the lens mount and thereby retain the lens 15ª in superposed position with respect to the spectacle ends.

It will be understood that to provide attachments for the other lens mounts of the spectacles shown in Figs. 1 and 3, it is necessary to reverse the arrangement of the lips of the lenses 15 and 15ª, such reversal having been illustrated in Figs. 1 and 3.

From the foregoing description taken in conjunction with the accompanying drawings, it will be manifest that I have provided a dark glass attachment which does not necessitate dispensing with the usual eyeglass or spectacles worn by one for corrective purposes so that the darkening effect can be secured without impairing the sight, and without unnecessarily encumbering the eye glasses or spectacles as in the case when superimposing a pair of conventional dark glasses on the eyeglasses or spectacles.

What I claim is:

1. A device of the character described, comprising a darkened lens, and means on the lens by which it can be detachably secured in superposed relation to the lens of an eyeglass or spectacle, said means comprising peripherally disposed lips and a resilient member having lens receiving lips adapted to co-operate with the first lips in the manner and for the purpose described.

2. An attachment of the character described, comprising a lens, attaching lips on the lens, a leaf spring secured to the lens, and attaching lips carried by the spring.

3. An attachment of the character described, comprising a lens, attaching lips rigidly mounted on the lens, a spring secured to the lens at one end, and companion attaching lips on the other end of the spring.

4. An attachment of the character described comprising a lens having integral attaching lips, a leaf spring carried by the lens, and lips secured to the leaf spring, said leaf spring being so arranged as to cooperate with the integral attaching lips to clamp the lens upon a lens of eyeglasses or spectacles.

5. An attachment of the character described comprising a lens, rigidly mounted attaching lips on the lens and a leaf spring secured upon said lens, lips integral with said leaf spring and being adapted to be urged toward the center of the lens.

6. An attachment of the character described comprising a lens, a lip formed integral with said lens upon one side thereof and a leaf spring secured upon the opposite side of the lens, lips formed integral with said leaf spring and adapted to be urged thereby toward the first mentioned lip.

In testimony whereof I have signed my name to this specification.

HERBERT M. ORRISS.